US012182239B2

(12) United States Patent
Sunwoo et al.

(10) Patent No.: US 12,182,239 B2
(45) Date of Patent: Dec. 31, 2024

(54) APPARATUS AND METHOD OF PERFORMING USER AUTHENTICATION

(71) Applicant: KT&G CORPORATION, Daejeon (KR)

(72) Inventors: Paul Joon Sunwoo, Seoul (KR); Jin Soo Seong, Seoul (KR)

(73) Assignee: KT&G CORPORATION, Daejeon (KR)

( * ) Notice: Subject to any disclaimer, the term of this patent is extended or adjusted under 35 U.S.C. 154(b) by 610 days.

(21) Appl. No.: 17/268,987

(22) PCT Filed: Oct. 6, 2020

(86) PCT No.: PCT/KR2020/013569
§ 371 (c)(1),
(2) Date: Feb. 17, 2021

(87) PCT Pub. No.: WO2021/085880
PCT Pub. Date: May 6, 2021

(65) Prior Publication Data
US 2022/0284083 A1    Sep. 8, 2022

(30) Foreign Application Priority Data
Oct. 28, 2019   (KR) .................. 10-2019-0134799

(51) Int. Cl.
| | | |
|---|---|---|
| *G06F 21/32* | (2013.01) | |
| *G06F 18/214* | (2023.01) | |
| *G06F 18/22* | (2023.01) | |
| *G06K 9/62* | (2022.01) | |
| *G06V 10/96* | (2022.01) | |
| *G06V 40/10* | (2022.01) | |

(52) U.S. Cl.
CPC ............ *G06F 21/32* (2013.01); *G06F 18/214* (2023.01); *G06F 18/22* (2023.01); *G06V 10/96* (2022.01); *G06V 40/10* (2022.01)

(58) Field of Classification Search
CPC ........ G06F 21/32; G06F 18/22; G06F 18/214; G06V 10/96; G06V 40/10
See application file for complete search history.

(56) References Cited

U.S. PATENT DOCUMENTS

| | | | | |
|---|---|---|---|---|
| 9,569,605 | B1 * | 2/2017 | Schneider | ............. H04L 9/3231 |
| 10,289,821 | B2 | 5/2019 | Kim et al. | |
| 10,810,292 | B2 | 10/2020 | Kim et al. | |

(Continued)

FOREIGN PATENT DOCUMENTS

| | | |
|---|---|---|
| CN | 108847941 A | 11/2018 |
| CN | 110223698 A | 9/2019 |

(Continued)

OTHER PUBLICATIONS

Office Action dated Mar. 8, 2022 from the Japanese Patent Office in JP Application No. 2021-504525.

(Continued)

*Primary Examiner* — Yonas A Bayou
(74) *Attorney, Agent, or Firm* — Sughrue Mion, PLLC (57) ABSTRACT

A user authentication apparatus trains a user authentication model by using biometric data of a user which was used in previous user authentication as training data, and performs user authentication by using the trained user authentication model.

11 Claims, 9 Drawing Sheets

(56) References Cited

U.S. PATENT DOCUMENTS

| | | |
|---|---|---|
| 10,980,275 B2 | 4/2021 | Batista et al. |
| 2015/0249664 A1 | 9/2015 | Talhami et al. |
| 2016/0029697 A1* | 2/2016 | Shafer .................. G05F 1/66 |
| | | 131/328 |
| 2017/0116401 A1* | 4/2017 | Kim .................. G06V 40/50 |
| 2018/0293370 A1* | 10/2018 | Kim .................. G06F 21/45 |
| 2019/0053540 A1* | 2/2019 | Baker .................. A24F 40/51 |
| 2019/0140833 A1 | 5/2019 | Grajek et al. |
| 2019/0272831 A1 | 9/2019 | Kajarekar |
| 2019/0362129 A1* | 11/2019 | Sandhan .................. H04M 1/725 |
| 2020/0380101 A1 | 12/2020 | Arii |

FOREIGN PATENT DOCUMENTS

| | | |
|---|---|---|
| JP | 2018-514196 A | 6/2018 |
| KR | 10-2016-0040444 A | 4/2016 |
| KR | 10-2017-0046436 A | 5/2017 |
| KR | 10-2018-0085587 A | 7/2018 |
| KR | 10-2018-0113840 A | 10/2018 |
| WO | 2014/150704 A2 | 9/2014 |
| WO | 2018/179325 A1 | 10/2018 |

OTHER PUBLICATIONS

Communication dated Mar. 23, 2023 issued by the State Intellectual Property Office of the P.R. China in application No. 202080005007.6.

Extended European Search Report issued Aug. 11, 2021 in European Application No. 20835672.5.

Written Opinion for PCT/KR2020/013569 dated Jan. 12, 2021 [PCT/ISA/237].

Korean Intellectual Property Office Notice of Non-Final Rejection for KR10-2019-0134799 dated Dec. 19, 2020.

International Search Report for PCT/KR2020/013569 dated Jan. 12, 2021 [PCT/ISA/210].

\* cited by examiner

|  | FIRST | SECOND | THIRD | FOURTH | FIFTH |
|---|---|---|---|---|---|
| BIOMETRIC DATA | | | | | |
| USER AUTHENTICATION | FAILURE | FAILURE | FAILURE | FAILURE | SUCCESS |
| ADD TO TRAINING DATA | NO | NO | NO | NO | YES |

[Figure 6]

|  | FIRST | SECOND | THIRD | FOURTH | FIFTH |
|---|---|---|---|---|---|
| BIOMETRIC DATA | | | | | |
| USER AUTHENTICATION | FAILURE | FAILURE | FAILURE | FAILURE | SUCCESS |
| ADD TO TRAINING DATA | NO | YES | YES | YES | YES |

【Figure 7】

| | FIRST | SECOND | THIRD | FOURTH | FIFTH |
|---|---|---|---|---|---|
| OBTAINED TIME (WITH REFERENCE TO FIFTH ORDER) | 25 SECONDS BEFORE | 18 SECONDS BEFORE | 8 SECONDS BEFORE | 3 SECONDS BEFORE | 0 SECOND |
| BIOMETRIC DATA | | | | | |
| USER AUTHENTICATION | FAILURE | FAILURE | FAILURE | FAILURE | SUCCESS |
| ADD TO TRAINING DATA | NO | YES | YES | YES | YES |

【Figure 8】

| | FIRST | SECOND | THIRD | FOURTH | FIFTH |
|---|---|---|---|---|---|
| OBTAINED TIME (WITH REFERENCE TO FIFTH ORDER) | 25 SECONDS BEFORE | 18 SECONDS BEFORE | 8 SECONDS BEFORE | 3 SECONDS BEFORE | 0 SECOND |
| BIOMETRIC DATA | | | | | |
| USER AUTHENTICATION | FAILURE | FAILURE | FAILURE | FAILURE | SUCCESS |
| ADD TO TRAINING DATA | NO | NO | YES | YES | YES |

【Figure 9】

|  | FIRST | SECOND | THIRD | FOURTH | FIFTH |
|---|---|---|---|---|---|
| OBTAINED TIME | 6 SECONDS BEFORE OBTAINING SECOND DATA | 1.3 SECONDS BEFORE OBTAINING THIRD DATA | 1.5 SECONDS BEFORE OBTAINING FOURTH DATA | 1 SECOND BEFORE OBTAINING FIFTH DATA | 0 SECOND |
| BIOMETRIC DATA |  |  |  |  |  |
| USER AUTHENTICATION | FAILURE | FAILURE | FAILURE | FAILURE | SUCCESS |
| ADD TO TRAINING DATA | NO | YES | YES | YES | YES |

【Figure 10】

|  | FIRST | SECOND | THIRD | FOURTH | FIFTH |
|---|---|---|---|---|---|
| SIMILARITY | 97% | 89% | 85% | 96% | 99% |
| BIOMETRIC DATA |  |  |  |  |  |
| USER AUTHENTICATION | FAILURE | FAILURE | FAILURE | FAILURE | SUCCESS |
| ADD TO TRAINING DATA | YES | NO | NO | YES | YES |

APPARATUS AND METHOD OF PERFORMING USER AUTHENTICATION

CROSS REFERENCE TO RELATED APPLICATIONS

This application is a National Stage of International Application No. PCT/KR2020/013569 filed Oct. 6, 2020, claiming priority based on Korean Patent Application No. 10-2019-0134799 filed Oct. 28, 2019.

TECHNICAL FIELD

The present disclosure relates to an apparatus and a method of performing user authentication.

BACKGROUND ART

For security, safety, privacy, and the like, electric devices may include a user authentication function. User-created information such as a password or a pattern-type cryptography or intrinsic biometric data of the user such as an iris, fingerprint, and a blood vessel may be used for user authentication.

A user authentication apparatus, which performs user authentication by using biometric data, may fail to correctly recognize a user due to contamination of a sensor, changes in fingerprints, and the like.

DISCLOSURE

Technical Solution

Provided are an apparatus and a method of performing user authentication capable of preventing a decrease in user recognition rates.

Provided is a method of performing user authentication, the method including obtaining biometric data, performing user authentication based on the obtained biometric data, adding the biometric data after user authentication to training data, training a user authentication model by using the training data, wherein the user authentication model is a learning model performing user authentication, obtaining new biometric data, and performing user authentication based on the new biometric data by using the user authentication model.

The technical goals are not limited to the above, and other technical goals may be inferred from the following examples.

Advantageous Effects

A user authentication model is trained with respect to biometric data being input in a process of using a user authentication apparatus, and thus, obstacles such as contamination of a sensor, change in fingerprints, and the like may be reflected to training. Therefore, the user authentication apparatus may perform user authentication to be robust to the obstacles by using the user authentication model. Accordingly, the user authentication apparatus may prevent decrease in user recognition rates.

*8Effects of the present disclosure are not limited to the above descriptions, and more various effects are included in the present specification.

BEST MODE

According to an embodiment, a method of performing user authentication includes: obtaining biometric data; performing user authentication based on the obtained biometric data; adding the biometric data to training data after the user authentication is performed; training, by using the training data, a user authentication model that is a learning model configured to perform the user authentication; and obtaining new biometric data and performing user authentication based on the new biometric data by using the user authentication model.

The adding includes adding success biometric data to the training data, the success biometric data being the biometric data that succeeded in the user authentication.

The adding includes adding previous biometric data to the training data, the previous biometric data being biometric data obtained before the success biometric data is obtained.

The adding of the previous biometric data to the training data includes adding a predetermined number of the biometric data obtained immediately before the success biometric data is obtained to the training data.

The previous biometric data may be biometric data obtained within a predetermined period before the success biometric data is obtained.

The adding of the previous biometric data to the training data includes adding a predetermined number of the previous biometric data obtained within a predetermined period before the success biometric data is obtained.

The adding of the previous biometric data to the training data includes adding a plurality of pieces of the previous biometric data which are sequentially obtained to the training data, wherein each of a time interval between adding a piece of the previous biometric data to the training data and adding another piece of the previous biometric data to the training data and a time interval between adding the success biometric data to the training data and adding a piece of the previous biometric data, obtained immediately before the success biometric data, to the training data is less than or equal to a predetermined time interval.

The adding includes adding similar biometric data to the training data, the similar biometric data being the biometric data and having a similarity equal to or greater than a first reference value with reference data.

The performing of the user authentication includes determining that the user authentication succeeded when similarity between the reference data and the obtained biometric data is equal to or greater than a second reference value, wherein the second reference value is a value greater than the first reference value.

The reference data is biometric data of the user obtained in advance for user authentication, and the adding further includes adding the reference data to the training data.

The method may further include determining whether the user authentication model needs to be trained based on a user recognition rate of the user authentication model.

According to another embodiment, an apparatus for performing user authentication includes: a sensor configured to obtain biometric data; a memory configured to store at least one program; and a controller configured to perform user authentication by executing the at least one program, the program includes instructions to implement operations of: performing user authentication on the obtained biometric data, adding the biometric data to the training data after the user authentication, training, by using the training data, a user authentication model that is a learning model configured to perform the user authentication, obtaining new biometric data, and performing user authentication based on the new biometric data by using the user authentication model.

The apparatus further includes a battery; and a heater configured to receive power from the battery and heat an aerosol generating material, and the controller controls power delivered from the battery to the heater.

The controller controls the power delivered to the heater, based on a result of the user authentication.

The apparatus further includes an input interfacing element configured to obtain a user input for controlling the device, and the controller adds biometric data to the training data, the biometric data being obtained from the input interfacing element after succeeding in user authentication.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Hereinafter, embodiments of the present disclosure will be described in detail with reference to the drawings.

Figure 1:
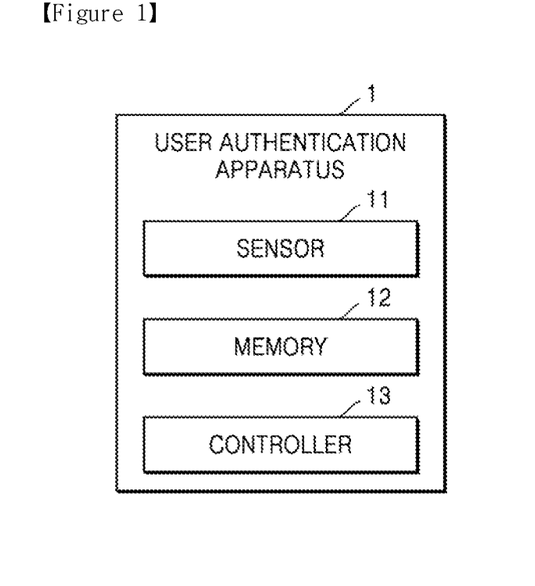
FIG. 1 shows an example of a user authentication apparatus.

FIG. 1 shows an example of a user authentication apparatus.

A user authentication apparatus 1 may perform user authentication by using biometric data. The user authentication apparatus 1 may be a separate apparatus or an apparatus included in another device requiring a user authentication function. The user authentication apparatus 1 may be used for opening and closing of entrances. Also, the user authentication apparatus 1 may be used for user authentication for operating devices such as a smart phone, a tablet device, a wearable device, a computer, and an electric cigarette. Also, the user authentication apparatus 1 may be used for authority certification in fields such as finance or national defense that require security.

The user authentication apparatus 1 may use various biometric data such as fingerprint data, iris data, vein data, face shape data, palm print data, voice data, and the like. Biometric data used by the user authentication apparatus 1 is not limited to the data listed above. In a user authentication process, the user authentication apparatus 1 may use one type of biometric data or a plurality of types of biometric data.

The user authentication apparatus 1 may include a sensor 11, a memory 12, and a controller 13.

The sensor 11 may be used for obtaining biometric data. The sensor 11 may be an image sensor, a fingerprint sensor, an acoustic sensor, a temperature sensor, an electro-optical sensor, a bio sensor, an ultrasonic sensor, but is not limited thereto.

The memory 12 may store the biometric data and at least one program executed by the controller 13. The program may include instructions that implement operations of the controller 13, which will be described in detail below. The memory 12 may be implemented as various types such as random access memory (RAM), for example, dynamic random access memory (DRAM), static random access memory (SRAM), and the like, read-only memory (ROM), or electrically erasable programmable read-only memory (EEPROM).

The controller 13 may comprise at least one processor. A processor can be implemented as an array of a plurality of logic gates or can be implemented as a combination of a general purpose microprocessor and a memory in which a program executable in the microprocessor is stored. It will be understood by one of ordinary skill in the art that the processor can be implemented in other forms of hardware.

The controller 13 may perform user authentication by using the biometric data. The controller 13 may perform user authentication based on various algorithms.

For example, the controller 13 may compare similarity between the biometric data and reference data, and may authenticate the user when the similarity is equal to or greater than a predetermined reference value. In this case, the reference data is data used to determine whether the biometric data obtained in the process of using the user authentication apparatus 1 is biometric data of the user.

For example, the controller 13 may compare the biometric data with the reference data based on a pattern recognition algorithm, a machine learning algorithm, an image processing algorithm, a signal processing algorithm, and the like.

For example, the controller 13 may perform user authentication by using a learning model for machine learning. The user authentication apparatus 1 may use a user authentication model that is a learning model for performing user authentication. The user authentication model may be based on a neural network such as a deep belief network and a convolutional neural network, reinforcement learning, and the like, but is not limited to the above-listed types. The controller 13 may execute user authentication by generating a user authentication model or loading a user authentication model that is stored in advance in the memory 12.

Training data for the controller 13 to train or re-train the user authentication model may include the reference data and the biometric data obtained by the user authentication apparatus 1. The controller 13 may train the user authentication model by using the training data and execute user authentication by using the trained user authentication model. The controller 13 may re-train the user authentication model by using the training data and execute user authentication by using the re-trained user authentication model.

The following user authentication methods may be performed by the user authentication apparatus 1 of FIG. 1. Alternatively, the following user authentication methods may be performed by the user authentication apparatus 1 of FIG. 1 or other apparatuses.

Figure 2:
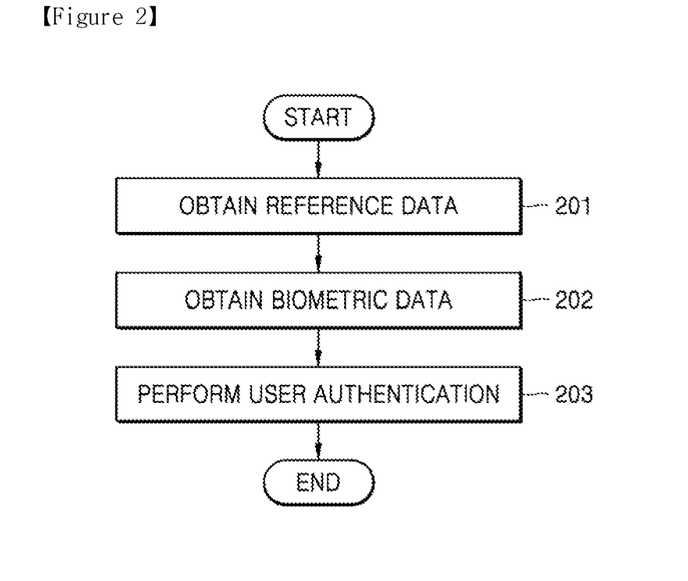
FIGS. 2 through 4 show examples of user authentication methods.

FIG. 2 shows an example of a user authentication method.

In operation 201, the controller 13 obtains reference data. The reference data may be the biometric data identified as biometric data of the user. The controller 13 may obtain the reference data through the sensor 11, load the reference data that is stored in advance in the memory 12, or obtain the reference data from other devices. The reference data may be used later as a reference for determining whether the biometric data obtained by the user authentication apparatus 1 is the biometric data of the user.

In operation 202, the controller 13 obtains biometric data via the sensor 11. For example, the reference data may correspond to a password set by the user, and the biometric data obtained by the controller 13 in operation 202 may correspond to the password input by the user for authentication in the process of using the user authentication apparatus 1.

In operation 203, the controller 13 performs user authentication based on the biometric data obtained in operation 202.

The controller 13 may perform user authentication by comparing similarity between the obtained biometric data and the reference data. For example, the controller 13 may compare similarity between the biometric data and the reference data based on the pattern recognition and then execute user authentication based on the comparison results. For example, the controller 13 may compare similarity between the biometric data and the reference data based on the user authentication model and then execute user authentication based on the comparison results.

The controller 13 may determine that the user authentication succeeded when the similarity between the biometric data and the reference data is equal to or greater than a predetermined second reference value, and may determine that the user authentication failed when the similarity between the biometric data and the reference data is less than the second reference value.

Figure 3:
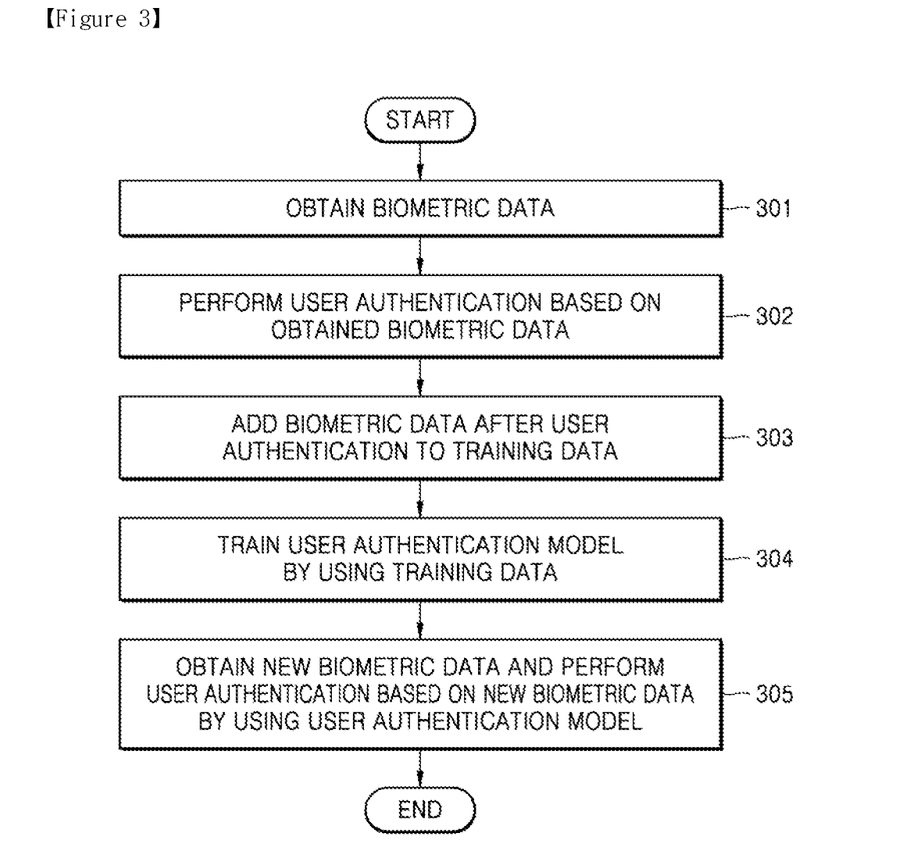

FIG. 3 shows an example of a user authentication method.

In operation 301, the controller 13 obtains biometric data. The controller 13 may obtain user's biometric data via the sensor 11.

In operation 302, the controller 13 performs user authentication based on the obtained biometric data. The controller 13 may perform user authentication by comparing similarity between the obtained biometric data and the reference data. Various algorithms such as pattern recognition may be used for user authentication.

The controller 13 may perform user authentication based on the obtained biometric data, without using a user authentication model. Alternatively, the controller 13 may perform user authentication based on the obtained biometric data by using the user authentication model. The user authentication model may be stored in advance in the memory 12. The user authentication model may be a learning model for machine learning. For example, the user authentication model may be a neural network model or a reinforcement learning model, but it is not limited thereto.

In operation 303, the controller 13 may add the biometric data which has been used for the user authentication to the learning data. The controller 13 may add success biometric data to the training data, the success biometric data being biometric data that succeeded in user authentication. The controller 13 may also add failure biometric data to the training data, the failure biometric data being biometric data that failed in user authentication. In addition, the controller 13 may add the reference data to the training data. Furthermore, the controller 13 may add similar biometric data to the training data, the similar biometric data having similarity equal to or greater than a first reference value with the reference data. The first reference value may be a predetermined value. The first reference value may be a value smaller than a second reference value that is a reference for determining the success biometric data.

The controller 13 may update training data with newly obtained biometric data. For example, the controller 13 may replace the failure biometric data, which is previously obtained, with the success biometric data that is newly obtained.

The training data may be stored in the memory 12. Alternatively, the learning data may be stored in a memory of another apparatus connected to the user authentication apparatus 1. The other apparatus may be an apparatus communicating with the user authentication apparatus 1 in a wireless or wired manner. For example, the user authentication apparatus 1 may be an apparatus included in the aerosol generating device, and the other apparatus may be an external apparatus such as a smart phone or computer that may communicate with the aerosol generating device.

In operation 304, the controller 13 may train the user authentication model by using the training data. Alternatively, the controller 13 may re-train the user authentication model by using the training data.

For example, the user authentication model may be a deep neural network (DNN), and the controller 13 may train training parameters of the user authentication model, such as a weight and a bias, by using the training data. For example, the user authentication model may be a convolution neural network (CNN), and the controller 13 may train the training parameters of the user authentication model such as weights of filters (or kernels) by using the training data. For example, the user authentication may be a reinforcement learning model, and the controller 13 may train the user authentication by using the training data to maximize a reward or minimize a penalty.

Alternatively, other apparatus may train or re-train the user authentication model by using the training data, and deliver the user authentication model, after training or re-training, to the user authentication apparatus 1.

In operation 305, the controller 13 may obtain new biometric data and perform user authentication based on the new biometric data by using the user authentication model. In operation 305, the controller 13 may perform user authentication by using the user authentication model that is trained or re-trained in operation 304.

The user authentication model is trained not only with the reference data but also with biometric data obtained in a user authentication process, so it reflects changes occurring in a process of using the user authentication device. Therefore, by performing user authentication based on new biometric data by using the user authentication model, the user recognition failure of the user authentication device 1 may be prevented.

Figure 4:
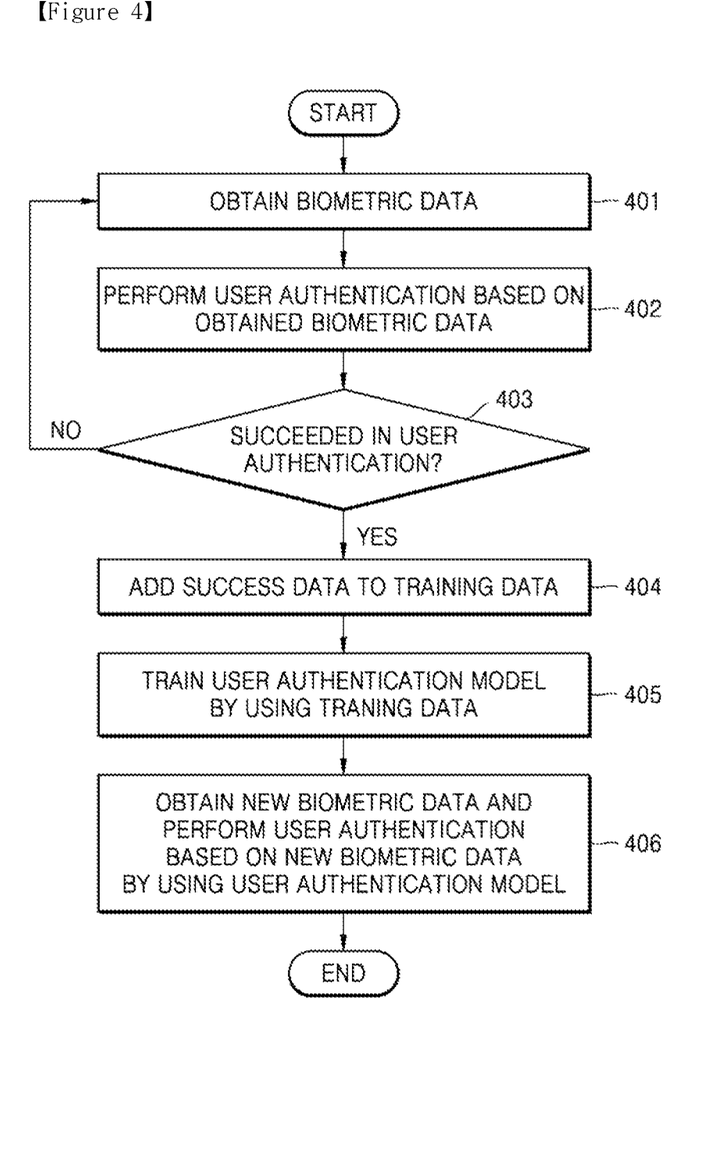

FIG. 4 shows an example of a user authentication method.

Operation 401 and operation 402 may respectively include characteristics of operation 301 and operation 302 shown in FIG. 3.

In operation 403, the controller 13 determines whether the user authentication succeeded. The controller 13 repeats operation 401 when the user authentication failed, and executes operation 404 when the user authentication succeeded.

For example, the controller 13 may determine that the user authentication succeeded when the similarity between the obtained biometric data and the reference data is equal to or greater than a predetermined second reference value, and may determine that the user authentication failed when the similarity between the biometric data and the reference data is less than the second reference value.

In operation 404, the controller 13 may add success biometric data to the training data, the success biometric data being biometric data that succeeded in the user authentication. Various embodiments regarding operation 404 will be described with reference to FIGS. 5 through 10.

Figure 5:
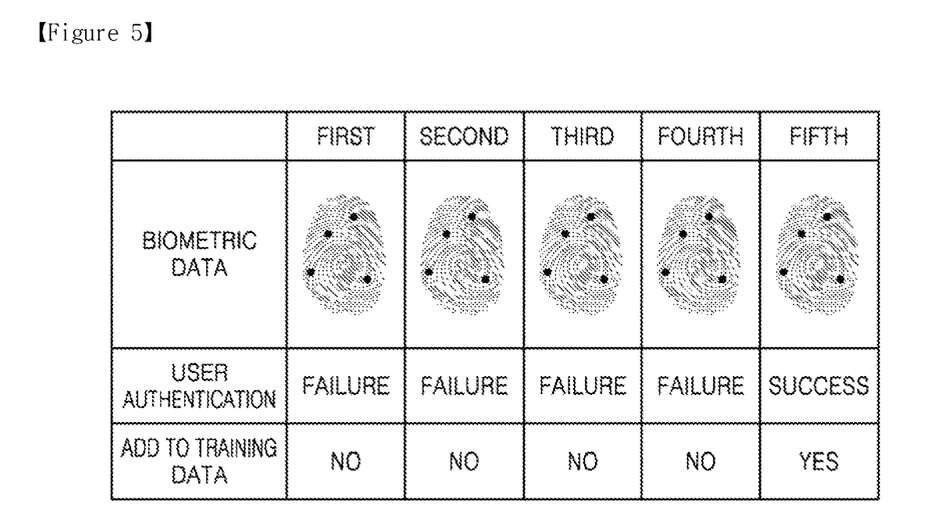
FIGS. 5 through 10 show examples of methods of obtaining training data.

FIG. 5 shows an example of obtaining training data.

The controller 13 may add the success biometric data to the training data. For example, when fingerprint data is obtained five times for the user authentication and fingerprint data obtained in a fifth order is the success biometric data, the controller 13 may not add fingerprint data obtained in first through fourth orders to the training data, as the data is failure biometric data, and add the fingerprint data that is obtained in the fifth order to the training data.

The controller 13 may have the biometric data of the user included in the training data by adding the success biometric data to the training data.

Figure 6:
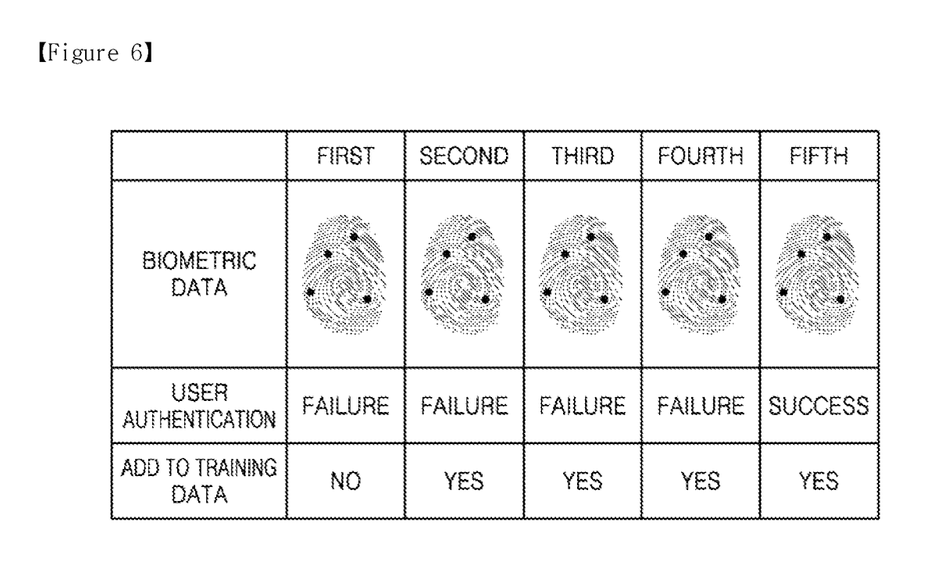

FIG. 6 shows an example of a method of obtaining training data.

The controller 13 may add the success biometric data and previous biometric data to the training data, the previous biometric data being biometric data obtained earlier than the success biometric data. The controller 13 may add a predetermined number of pieces of previous biometric data obtained immediately before the success biometric data to the training data. For example, when the fingerprint data is obtained five times for user authentication, fingerprint data obtained in a fifth order is success biometric data, and the predetermined number is three, the controller 13 may add second through fourth fingerprint data to the training data together with the success biometric data, the second through fourth fingerprint data being three pieces of previous biometric data.

Figure 7:
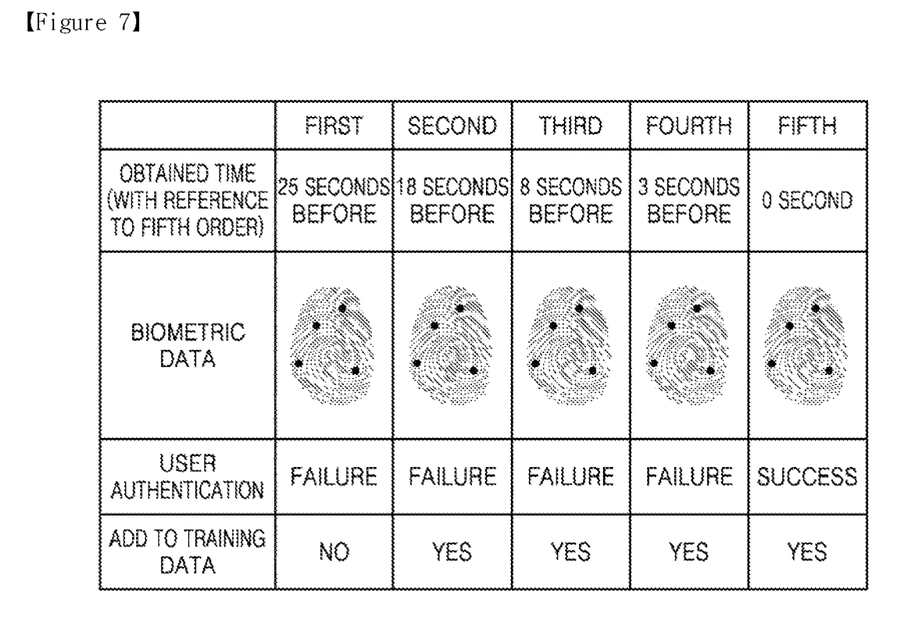

FIG. 7 shows an example of a method of obtaining training data.

The controller 13 may add the success biometric data and the previous biometric data to the training data. The controller 13 may add the previous biometric data obtained in a predetermined period to the training data. The controller 13 may add the previous biometric data to the training data, the previous biometric data obtained in a predetermined period before the success biometric data is obtained. For example, when fingerprint data obtained in a fifth order is success biometric data, first through fourth fingerprint data is obtained twenty five seconds, eighteen seconds, eight seconds, and three seconds before obtaining the fifth fingerprint data, respectively, and assuming that the predetermined period is twenty seconds, the controller 13 may add second through fourth fingerprint data to the training data, the second through fourth fingerprint data being previous biometric data obtained within twenty seconds before obtaining the success biometric data.

Figure 8:
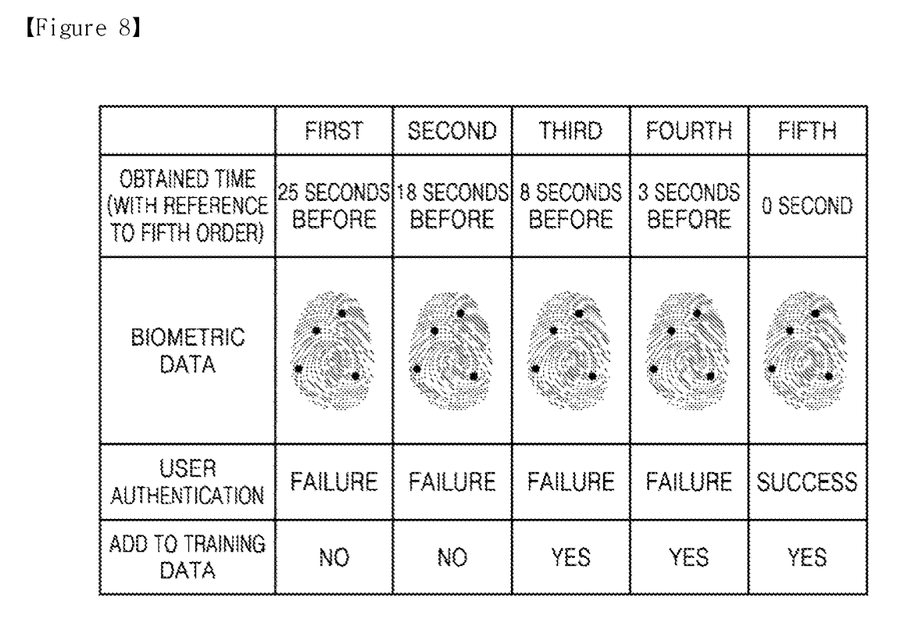

FIG. 8 shows an example of a method of obtaining training data.

The controller 13 may add the success biometric data and the previous biometric data to the training data. The controller 13 may add the predetermined number of pieces of previous biometric data obtained in the predetermined period to the training data. For example, when the fingerprint data obtained in a fifth order is success biometric data, first through fourth data is obtained at twenty five seconds, eighteen seconds, eight seconds, and three seconds before obtaining the fifth fingerprint, respectively. Assuming that the predetermined number is two and the predetermined period is twenty seconds, the controller 13 may add third through fourth previous biometric data to the training data, the third through fourth previous biometric data being previous biometric data satisfying conditions, i.e., the predetermined number of two and the predetermined period of twenty seconds.

Figure 9:
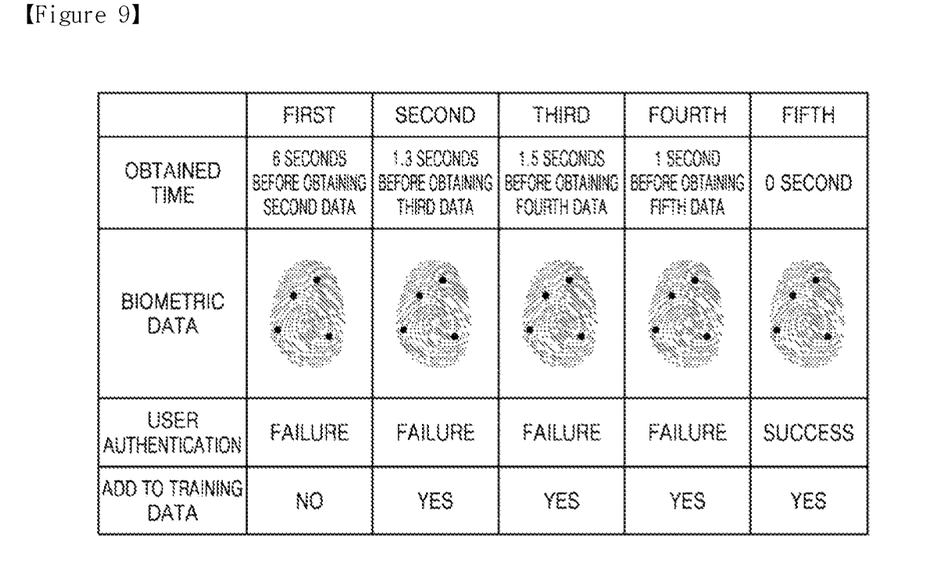

FIG. 9 shows an example of a method of obtaining training data.

The controller 13 may add the success biometric data and the previous biometric data to the training data. The controller 13 may add the previous biometric data obtained sequentially with a predetermined time interval to the training data. In this case, time intervals between pieces of the previous biometric data and between the success biometric data and a piece of the previous biometric data obtained immediately before the success biometric data among the plurality of pieces of the previous biometric data may be less than or equal to a predetermined time interval.

For example, when fingerprint data obtained in a fifth order is success biometric data, fourth fingerprint data is obtained one second before obtaining the fifth fingerprint data, third fingerprint data is obtained 1.5 seconds before obtaining the fourth fingerprint data, second fingerprint data is obtained 1.3 seconds before obtaining the third fingerprint data, first fingerprint data is obtained six seconds before obtaining the second fingerprint data, and the predetermined time interval is two seconds, the controller 13 may add the second through fourth fingerprint data to the training data, as a time interval between obtaining the second through fourth fingerprint and next fingerprint data is within two seconds, and may not add the first fingerprint data to the training data, as a time interval between obtaining the first fingerprint data and the second fingerprint data exceeds two seconds.

Figure 10:
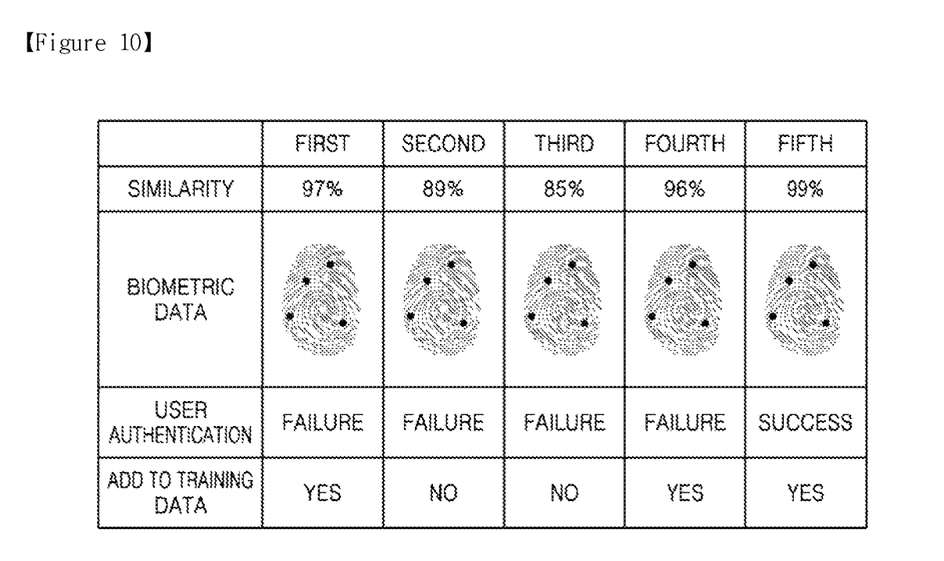

FIG. 10 shows an example of a method of obtaining training data.

The controller 13 may add success biometric data and similar biometric data to the training data, the similar biometric data being biometric data having similarity equal to or greater than a first reference value with the reference data. The similar biometric data may be previous biometric data or post biometric data that is biometric data obtained after the success biometric data. In this case, the first reference value may be a value smaller than a second reference value that is a reference for determining the success biometric data. For example, when first through fifth pieces of fingerprint data respectively having similarities of 97%, 89%, 85%, 96%, and 99% to the reference data are obtained, and when the first reference value is 95% and the second reference value is 99%, the controller 13 may add, to the training data, the fifth fingerprint that is success biometric data satisfying the second reference value and first and fourth pieces of fingerprint data that are similar biometric data satisfying the first reference value.

The user may provide fingerprint data several times to the user authentication apparatus 1 until the user authentication succeeds. In addition, the user may repeatedly attempt user authentication until the user authentication succeeds. That is, some of the biometric data obtained before the success biometric data may be estimated as biometric data of the user. In addition, from among the biometric data obtained in the process of using the user authentication apparatus 1, biometric data similar to the reference data may be estimated to be the biometric data of the user. Therefore, by using the method shown in FIGS. 5 through 10, the controller 13 may add plural pieces of biometric data of the user to the training data.

The previous biometric data and subsequent biometric data correspond to failure biometric data. The controller 13 may secure reliable training data by adding failure biometric data related to the success biometric data to the training data, without adding all of the failure biometric data to the training data.

By obtaining the training data according to the method with reference to FIGS. 5 through 10, the biometric data obtained in the user authentication process of the user authentication apparatus 1 may be used as training data.

In the method of adding training data with reference to FIGS. 5 through 10, fingerprint data is taken as an example for convenience of explanation, but other biometric data may be applied in a same manner.

Referring back to FIG. 4, in operation 405, the controller 13 may train the user authentication model by using the training data. Operation 405 may include characteristics of operation 304 of FIG. 3.

In operation 406, the controller 13 may obtain new biometric data and perform user authentication based on the new biometric data by using the trained user authentication model. In operation 406, the controller 13 may perform user authentication by using the user authentication model that is trained or re-trained in operation 405.

As the user authentication model is trained on biometric data input in the user authentication process, obstacles such as contamination of a sensor and fingerprint changes may be reflected in the training. Accordingly, the user authentication apparatus 1 may perform user authentication to be robust to the obstacles by using a user authentication model.

Figure 11:
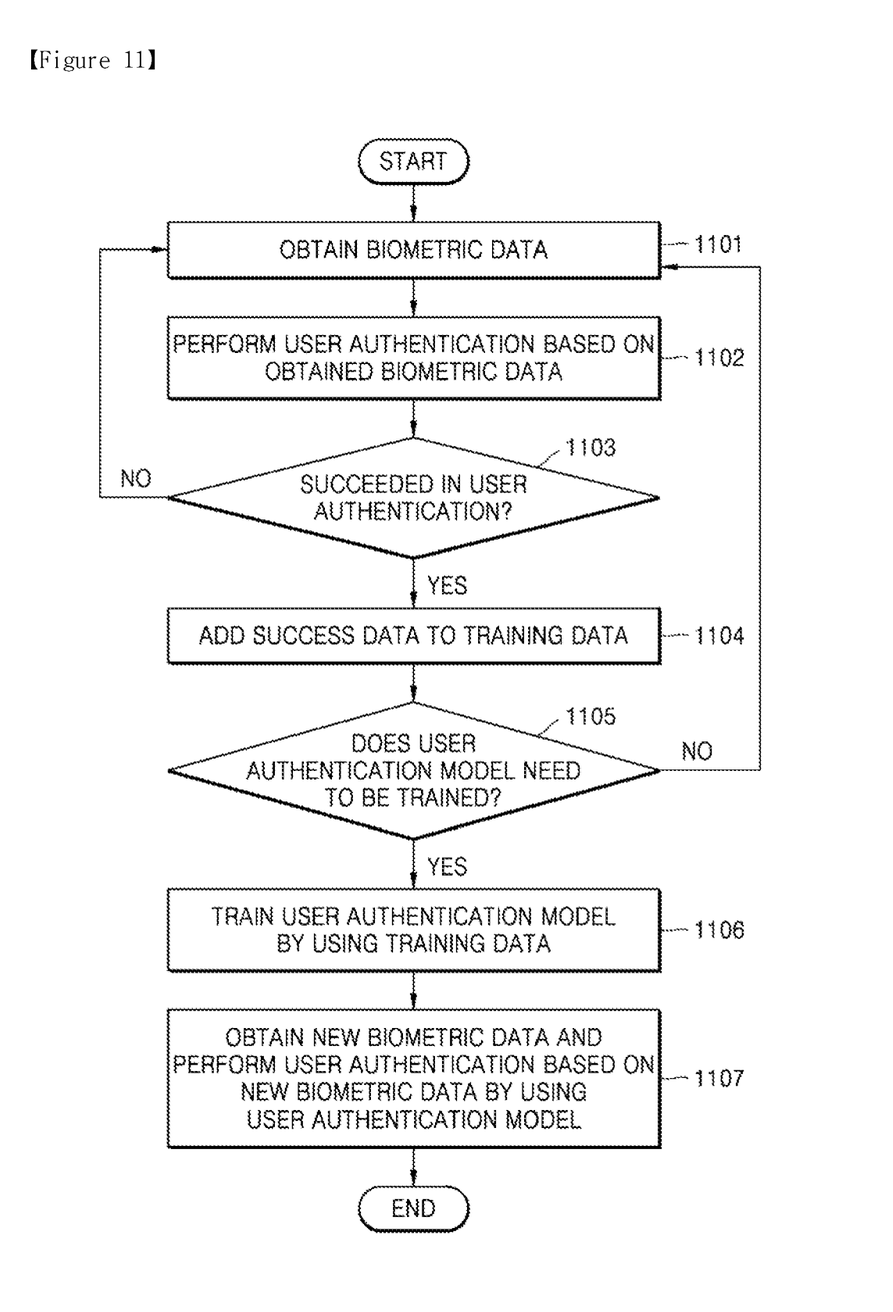
FIG. 11 shows a user authentication method according to an embodiment.

FIG. 11 shows a user authentication method according to an embodiment.

Comparing the user authentication method of FIG. 11 to the user authentication method of FIG. 4, operations 1101 through 1104 may respectively include characteristics of operations 401 through 404, and operations 1106 through 1107 may respectively include characteristics of operations 405 through 406. To avoid repeated descriptions, only operation 1105 will be described.

In operation 1105, the controller 13 may determine whether the user authentication is to be trained.

For example, the controller 13 may determine whether training is required based on whether training data to train the user authentication model is sufficiently obtained. If the number of pieces of training data is sufficient, or if the training data may be complimented by using data augmentation even though the number of pieces of training data is insufficient, the controller 13 may determine that the user authentication model needs to be trained.

For example, the controller 13 may determine whether training is required, based on a user recognition rate. When the number of failure biometric data obtained immediately before obtaining the success biometric data exceeds a predetermined number, the controller 13 may determine that the user authentication model needs to be trained. When the number of pieces of failure biometric data obtained immediately before obtaining the success biometric data is equal to or greater than the predetermined number, it may indicate that the user authentication rate of the user authentication device 1 is low.

Figure 12:
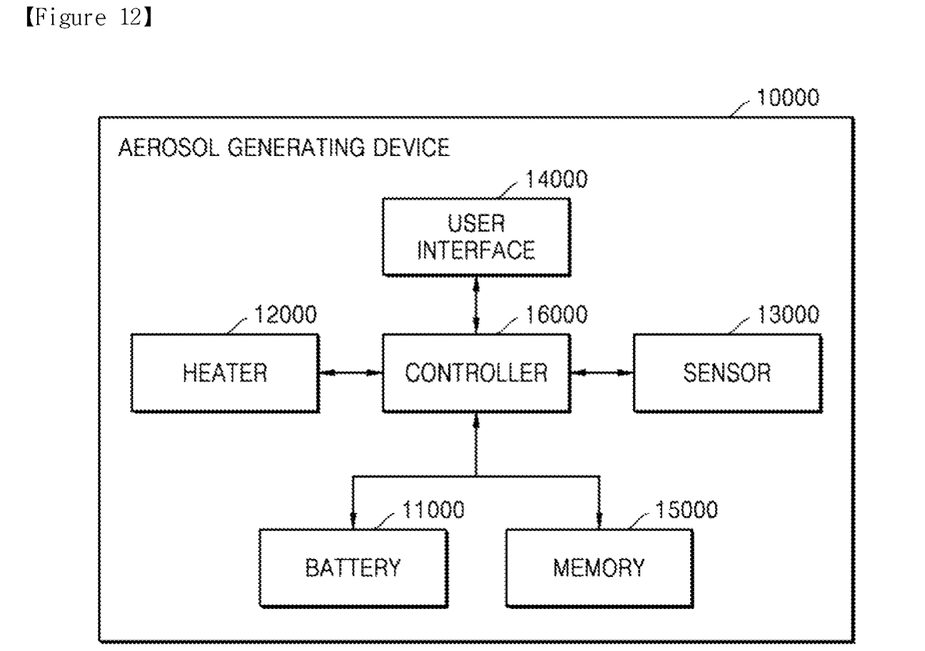
FIG. 12 is a block diagram showing a hardware configuration of an aerosol generating device.

FIG. 12 is a block diagram illustrating hardware components of the aerosol generating device according to an embodiment.

Referring to FIG. 12, the aerosol generating device 10000 may include a battery 11000, a heater 12000, a sensor 13000, a user interface 14000, a memory 15000, and a controller 16000. However, the internal structure of the aerosol generating device 10000 is not limited to the structures illustrated in FIG. 12. According to the design of the aerosol generating device 10000, it will be understood by one of ordinary skill in the art that some of the hardware components shown in FIG. 12 may be omitted or new components may be added.

In an embodiment, the aerosol generating device 10000 may be a device for generating aerosol by heating a cigarette. In another embodiment, the aerosol generating device 10000 may be a device for generating aerosol by heating a liquid composition of a cartridge. In another embodiment, the aerosol generating device 10000 may be a device for generating aerosol by heating a cigarette and a liquid composition of a cartridge.

In an embodiment, the aerosol generating device 10000 may consist of only a main body, in which case hardware components included in the aerosol generating device 10000 are located in the main body. In another embodiment, the aerosol generating device 10000 may consist of a main body and a cartridge, in which case hardware components included in the aerosol generating device 10000 are located separately in the main body and the cartridge. Alternatively, at least some of hardware components included in the aerosol generating device 10000 may be located in the main body and the cartridge, respectively.

Hereinafter, an operation of each of the components will be described without being limited to location in a particular space in the aerosol generating device 10000 is located.

*104The battery 11000 supplies electric power to be used for the aerosol generating device 10000 to operate. In other words, the battery 11000 may supply power such that the heater 12000 may be heated. In addition, the battery 11000 may supply power required for operation of other hardware components included in the aerosol generating device

10000, that is, the sensor 13000, the user interface 14000, the memory 15000, and the controller 16000. The battery 11000 may be a rechargeable battery or a disposable battery. For example, the battery 11000 may be a lithium polymer (LiPoly) battery, but is not limited thereto.

The heater 12000 receives power from the battery 11000 under the control of the controller 16000. The heater 12000 may receive power from the battery 11000 and heat a cigarette inserted into the aerosol generating device 10000, or heat the cartridge mounted on the aerosol generating device 10000.

The heater 12000 may be located in the main body of the aerosol generating device 10000. Alternatively, when the aerosol generating device 10000 consists of the main body and the cartridge, the heater 12000 may be located in the cartridge. When the heater 12000 is located in the cartridge, the heater 12000 may receive power from the battery 11000 located in at least one of the main body and the cartridge.

The heater 12000 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 12000 may be implemented by a metal wire, a metal plate on which an electrically conductive track is arranged, or a ceramic heating element, but is not limited thereto.

In an embodiment, the heater 12000 may be a component included in the cartridge. The cartridge may include the heater 12000, the liquid delivery element, and the liquid storage. The aerosol generating material accommodated in the liquid storage may be moved to the liquid delivery element, and the heater 12000 may heat the aerosol generating material absorbed by the liquid delivery element, thereby generating aerosol. For example, the heater 12000 may include a material such as nickel or chromium and may be wound around or arranged adjacent to the liquid delivery element.

In another embodiment, the heater 12000 may heat the cigarette inserted into the accommodation space of the aerosol generating device 10000. As the cigarette is accommodated in the accommodation space of the aerosol generating device 10000, the heater 12000 may be located inside and/or outside the cigarette. Accordingly, the heater 12000 may generate aerosol by heating the aerosol generating material in the cigarette.

Meanwhile, the heater 12000 may include an induction heater. The heater 13000 may include an electrically conductive coil for heating a cigarette or the cartridge in an induction heating method, and the cigarette or the cartridge may include a susceptor which may be heated by the induction heater.

The aerosol generating device 10000 may include at least one sensor 13000. A result sensed by the at least one sensor 13000 is transmitted to the controller 16000, and the controller 16000 may control the aerosol generating device 10000 to perform various functions such as controlling the operation of the heater, restricting smoking, determining whether a cigarette (or a cartridge) is inserted, and displaying a notification.

For example, the at least one sensor 13000 may include a puff detecting sensor. The puff detecting sensor may detect a user's puff based on any one of a temperature change, a flow change, a voltage change, and a pressure change.

In addition, the at least one sensor 13000 may include a temperature sensor. The temperature sensor may detect a temperature at which the heater 12000 (or an aerosol generating material) is heated. The aerosol generating device 10000 may include a separate temperature sensor for sensing a temperature of the heater 12000, or the heater 12000 itself may serve as a temperature sensor instead of including a separate temperature sensor. Alternatively, a separate temperature sensor may be further included in the aerosol generating device 10000 while the heater 12000 serves as a temperature sensor.

In addition, the at least one sensor 13000 may be used for obtaining biometric data. The at least one sensor 13000 may be an image sensor, a fingerprint sensor, an acoustic sensor, a temperature sensor, an electro-optical sensor, a biometric sensor, an ultrasonic sensor, but is not limited thereto.

The user interface 14000 may provide the user with information about the state of the aerosol generating device 10000. The user interface 14000 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices.

However, the aerosol generating device 10000 may be implemented by selecting only some of the above-described various interfacing devices.

The memory 15000 may be a hardware component configured to store various pieces of data processed in the aerosol generating device 10000, and the memory 15000 may store data processed or to be processed by the controller 16000.

The memory 15000 may store an operation time of the aerosol generating device 10000, the maximum number of puffs, the current number of puffs, at least one temperature profile, data on a user's smoking pattern, etc.

The controller 16000 is a hardware component configured to control general operations of the aerosol generating device 10000. The controller 16000 may include at least one processor.

The controller 16000 analyzes a result of the sensing by at least one sensor 13000, and controls processes that are to be performed subsequently.

The controller 16000 may control power supplied to the heater 12000 so that the operation of the heater 12000 is started or terminated, based on the result of the sensing by the at least one sensor 13000.

The controller 16000 may perform user authentication based on the user authentication methods described with reference to FIGS. 2 through 11. The controller 16000 may perform user authentication based on biometric data obtained through the at least one sensor 13000. When the user authentication is successful, the controller 16000 may control power supplied to the heater 12000 such that operations of the heater 12000 are started. For example, when the user authentication is successful, the controller 16000 may control the power provided to the heater 12000 such that the heater 12000 starts preheating.

In addition, based on the result of the sensing by the at least one sensor 13000, the controller 16000 may control the amount of power supplied to the heater 12000 and the time at which the power is supplied, so that the heater 12000 is heated to a predetermined temperature or maintained at an appropriate temperature.

In an embodiment, the controller 16000 may set a mode of the heater 12000 to a pre-heating mode to start the operation of the heater 12000 after receiving a user input to the aerosol generating device 10000. In addition, the controller 16000 may switch the mode of the heater 12000 from the pre-heating mode to an operation mode after detecting a user's puff by using the puff detecting sensor. In addition, the controller 16000 may stop supplying power to the heater 12000 when the number of puffs reaches a preset number after counting the number of puffs by using the puff detecting sensor.

The controller 16000 may control the user interface 14000 based on the result of the sensing by the at least one sensor 13000. For example, when the number of puffs reaches the preset number after counting the number of puffs by using the puff detecting sensor, the controller 16000 may notify the user by using at least one of a light emitter, a motor or a speaker that the aerosol generating device 10000 will soon be terminated.

Although not illustrated in FIG. 12, an aerosol generating system may be configured by the aerosol generating device 10000 and a separate cradle. For example, the cradle may be used to charge the battery 11000 of the aerosol generating device 10000. For example, the aerosol generating device 10000 may be supplied with power from a battery of the cradle to charge the battery 11000 of the aerosol generating device 10000 while being accommodated in an accommodation space of the cradle.

Figure 13:
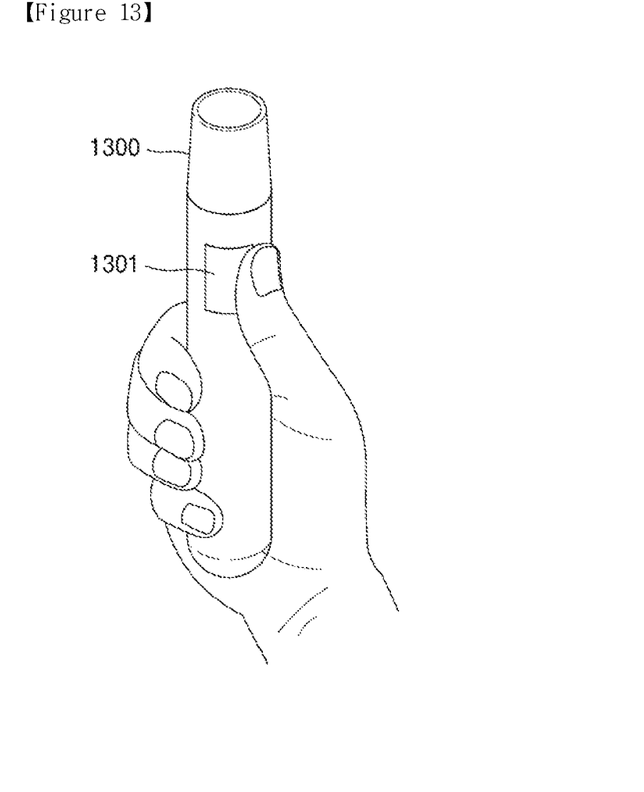
FIG. 13 shows an example in which a user uses an aerosol generating device.
Figure 14:
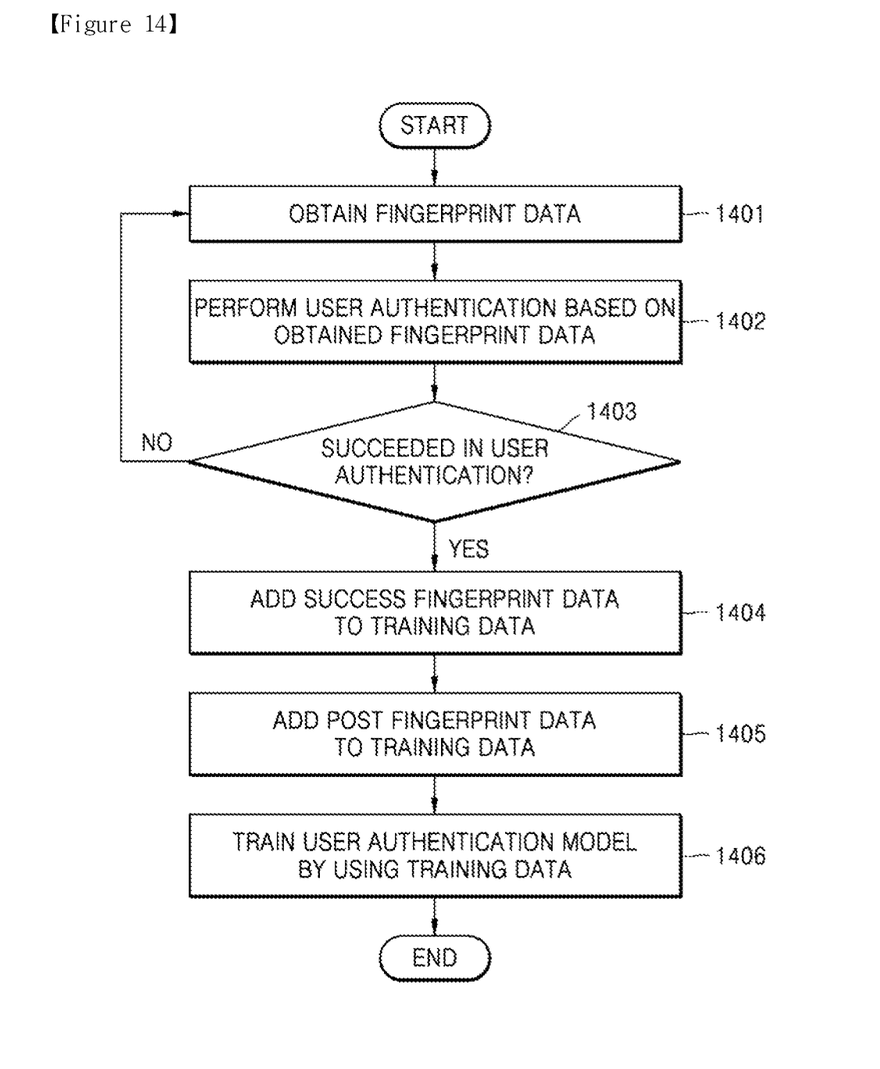
FIG. 14 shows an example of a method, performed by an aerosol generating device, of authenticating a user.

FIG. 13 shows an example in which a user uses an aerosol generating device. FIG. 14 shows an example of a method, performed by an aerosol generating device, of authenticating a user.

Referring to FIGS. 13 and 14, an aerosol generating device 1300 may be a device for generating aerosol by heating a cigarette and/or a liquid composition of a cartridge.

The aerosol generating device 1300 may include an input interfacing element 1301 for obtaining a user input for controlling the aerosol generating device 1300. For example, the input interfacing element 1301 may be a button, touch screen, or a touch pad. The user may control operation of the aerosol-generating device 1300 by operating the input interfacing element 1301. For example, the user may control operation modes of the aerosol generating device 1300 or may control a state of the aerosol generating device 1300 to be output via an output interfacing element, by adjusting the number and/or duration of touching the input interfacing element 1301.

The input interfacing element 1301 may include a fingerprint sensor. When a user brings a finger into contact with the input interfacing element 1301, the user's fingerprint data may be obtained via the fingerprint sensor.

In operation 1401, a controller of the aerosol generating device 1300 obtains fingerprint data. Operation 1401 may include characteristics of operation 401 shown in FIG. 4.

In operation 1402, the controller of the aerosol generating device 1300 performs user authentication based on the obtained fingerprint data. Operation 1402 may include characteristics of operation 402 of FIG. 4.

In operation 1403, the controller of the aerosol generating device 1300 determines whether the user authentication succeeds. The controller repeats operation 1401 when the user authentication fails, and performs operation 1404 when the user authentication succeeds.

In operation 1404, the controller of the aerosol generating device 1300 adds success fingerprint data to the training user, the success fingerprint data being fingerprint data that succeeded in user authentication. Operation 1404 may include characteristics of operation 404 of FIG. 4.

In operation 1405, the controller of the aerosol generating device 1300 adds post fingerprint data to training data, the post fingerprint data being fingerprint data obtained after the success fingerprint data. After the user authentication succeeds, the user may operate the input interfacing element 1301 for various reasons, for example, to control the aerosol generating device 1300. The user adds fingerprint data obtained through the input interfacing element 1301 in the process of using the aerosol generating device 1300 to the training data, thereby adding a plurality of pieces of fingerprint data of the user to the training data.

For example, the controller may add the post fingerprint data having a similarity equal to or greater than a predetermined value with the reference fingerprint data to the training data. For example, the controller may add a predetermined number of post fingerprint data to the training data, the post fingerprint data being obtained after the success fingerprint data. For example, the controller may add post fingerprint data obtained for a predetermined period after the success fingerprint data to the training data. For example, the controller may add post fingerprint data to the training data, the post fingerprint data being obtained in a predetermined time interval after the success fingerprint data.

In operation 1406, the controller of the aerosol generating device trains the user authentication model by using the training data. Operation 1406 may include characteristics of operation 405 of FIG. 4.

Although the method of performing user authentication based on the fingerprint data is described in the embodiments with reference to FIGS. 13 and 14, the method may be similarly applied to other biometric data than the fingerprint data.

At least one of the components, elements, modules or units (collectively "components" in this paragraph) represented by a block in the drawings, such as the controller 13, the controller 16000, the sensor 13000 in FIGS. 1 and 12, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. A method of performing user authentication, the method comprising:
   obtaining biometric data;
   performing user authentication based on the biometric data;
   adding the biometric data to training data after the performing the user authentication;
   training, by using the training data, a user authentication model that is a machine learning model configured to perform the user authentication; and
   performing the user authentication based on new biometric data by using the user authentication model,
   wherein the adding comprises:
      adding success biometric data to the training data, the success biometric data being the biometric data that succeeded in the user authentication; and
      adding previous biometric data to the training data, and
   wherein the adding of the previous biometric data to the training data comprises adding a predetermined number of pieces of the previous biometric data obtained within a predetermined period before the success biometric data is obtained to the training data.

2. The method of claim 1, wherein the adding of the previous biometric data to the training data comprises adding a predetermined number of pieces of the previous biometric data obtained immediately before the success biometric data is obtained to the training data.

3. The method of claim 1, wherein the adding of the previous biometric data to the training data comprises adding a plurality of pieces of the previous biometric data which are sequentially obtained to the training data, and
   wherein each of a time interval between adding a piece of the previous biometric data to the training data and adding another piece of the previous biometric data to the training data and a time interval between adding the success biometric data to the training data and adding a piece of the previous biometric data, obtained immediately before the success biometric data, to the training data is less than or equal to a predetermined time interval.

4. The method of claim 1, wherein the adding comprises adding similar biometric data to the training data, the similar biometric data being biometric data having a similarity equal to or greater than a first reference value with reference data.

5. The method of claim 4, wherein the performing of the user authentication comprises determining that the user authentication succeeded based on a similarity between the reference data and the obtained biometric data being equal to or greater than second reference value,
   wherein the second reference value is greater than the first reference value.

6. The method of claim 4, wherein the reference data is biometric data of a user obtained in advance for the user authentication, and
   wherein the adding further comprises adding the reference data to the training data.

7. The method of claim 1, further comprising determining whether the user authentication model needs to be trained, based on a user recognition rate of the user authentication model or the number of the training data.

8. An apparatus for performing user authentication, the apparatus comprising:
   a sensor configured to obtain biometric data;
   a memory configured to store at least one program; and
   a controller configured to perform user authentication by executing the at least one program,
   wherein the at least one program comprises instructions to implement operations of:
   performing the user authentication based on the obtained biometric data;
   adding the biometric data to training data after performing the user authentication;
   training, by using the training data, a user authentication model that is a machine learning model configured to perform the user authentication; and
   performing the user authentication based on new biometric data by using the user authentication model,
   wherein the adding comprises:
      adding success biometric data to the training data, the success biometric data being the biometric data that succeeded in the user authentication; and
      adding previous biometric data to the training data, and
   wherein the adding of the previous biometric data to the training data comprises adding a predetermined number of pieces of the previous biometric data obtained within a predetermined period before the success biometric data is obtained to the training data.

9. The apparatus of claim 8, further comprising:
   a battery; and
   a heater configured to receive power from the battery and heat an aerosol generating material,
   wherein the controller controls power supplied from the battery to the heater.

10. The apparatus of claim 9, wherein the controller controls the power delivered to the heater, based on a result of the user authentication.

11. The apparatus of claim 9, further comprising an input interfacing element configured to obtain a user input for controlling the apparatus,
    wherein the controller is configured to add biometric data, obtained by the input interfacing element after succeeding in the user authentication, to the training data.

* * * * *